(12) United States Patent
Zhou

(10) Patent No.: US 11,464,061 B2
(45) Date of Patent: Oct. 4, 2022

(54) TIME-FREQUENCY RESOURCE PREEMPTION DETERMINING METHOD AND DEVICE, AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 281 days.

(21) Appl. No.: 16/625,890

(22) PCT Filed: Jun. 23, 2017

(86) PCT No.: PCT/CN2017/089855
§ 371 (c)(1),
(2) Date: Dec. 23, 2019

(87) PCT Pub. No.: WO2018/232755
PCT Pub. Date: Dec. 27, 2018

(65) Prior Publication Data
US 2020/0154500 A1    May 14, 2020

(51) Int. Cl.
*H04W 76/18* (2018.01)
*H04L 1/18* (2006.01)
(Continued)

(52) U.S. Cl.
CPC ........... *H04W 76/18* (2018.02); *H04L 1/1819* (2013.01); *H04W 72/0446* (2013.01); *H04W 72/0453* (2013.01); *H04W 72/1289* (2013.01)

(58) Field of Classification Search
CPC ............. H04W 76/18; H04W 72/0446; H04W 72/0453; H04W 72/1289; H04L 1/1819; H04L 47/245
See application file for complete search history.

(56) References Cited

U.S. PATENT DOCUMENTS 10,313,044 B2   6/2019   Wang et al.
10,382,169 B2   8/2019   Cao et al.
(Continued)

FOREIGN PATENT DOCUMENTS

CN    1808986 A     7/2006
CN    101106474 A   1/2008
(Continued)

OTHER PUBLICATIONS

Extended European Search Report in Application No. 17914992.7, dated Nov. 17, 2020.
(Continued)

*Primary Examiner* — Jael M Ulysse
(74) *Attorney, Agent, or Firm* — Syncoda LLC; Feng Ma

(57) ABSTRACT

A time-frequency resource preemption determining method includes: receiving and reading first service data sent by the base station; if it is determined that the first service data fails to be received, reading second service scheduling control data in a set time period and in a set frequency range according to a time-frequency resource occupied by the first service data that fails to be received; and if the second service scheduling control data is read, and it is determined according to scheduling information carried in the second service scheduling control data that a time-frequency resource area occupied by the scheduled second service data covers a time-frequency resource area occupied by the first service data that fails to be received, determining that the second service data preempts the time-frequency resource of the first service data. As such, the situation of time-frequency resource preemption between service data can be determined.

19 Claims, 5 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 10,567,142 B2 | 2/2020 | Kim et al. | |
| 10,601,551 B2 | 3/2020 | Ying et al. | |
| 2011/0305450 A1 | 12/2011 | Pan et al. | |
| 2015/0334685 A1* | 11/2015 | Ji | H04W 72/1247 370/330 |
| 2017/0367110 A1* | 12/2017 | Li | H04L 1/1887 |
| 2018/0063865 A1* | 3/2018 | Islam | H04L 5/0064 |
| 2018/0070341 A1* | 3/2018 | Islam | H04L 1/1812 |
| 2018/0278368 A1* | 9/2018 | Kim | H04L 1/0043 |
| 2018/0287745 A1* | 10/2018 | Sun | H04L 1/1861 |
| 2018/0324816 A1* | 11/2018 | Islam | H04L 5/0053 |
| 2018/0324830 A1* | 11/2018 | Islam | H04L 5/0053 |
| 2018/0343100 A1* | 11/2018 | Zhang | H04L 5/0082 |
| 2019/0230670 A1* | 7/2019 | Zhang | H04W 72/08 |
| 2019/0268938 A1* | 8/2019 | Zhao | H04L 5/005 |
| 2019/0327751 A1* | 10/2019 | Dong | H04W 72/044 |
| 2019/0349136 A1* | 11/2019 | Kilinc | H04L 1/189 |
| 2019/0364563 A1* | 11/2019 | Jung | H04W 28/04 |
| 2020/0008216 A1* | 1/2020 | Iyer | H04W 72/042 |
| 2020/0037350 A1* | 1/2020 | Park | H04L 5/0053 |
| 2020/0059327 A1* | 2/2020 | Kini | H04L 5/0055 |
| 2020/0128570 A1* | 4/2020 | Wong | H04W 72/0453 |
| 2020/0213984 A1* | 7/2020 | Hwang | H04W 72/0453 |

FOREIGN PATENT DOCUMENTS

| | | |
|---|---|---|
| CN | 101471869 A | 7/2009 |
| CN | 101588603 A | 11/2009 |
| CN | 101924702 A | 12/2010 |
| CN | 102056319 A | 5/2011 |
| CN | 106455103 A | 2/2017 |
| CN | 106550317 A | 3/2017 |
| WO | 2010118602 A1 | 10/2010 |
| WO | 2016115683 A1 | 7/2016 |

OTHER PUBLICATIONS

Intel Corporation: "Remaining details of DL pre-emption indication", 3GPP Draft; R1-1710575, vol. RAN WG1, No. Qingdao, P.R. China; Jun. 27, 2017-Jun. 30, 2017, Jun. 17, 2017, XP051305146.
Mediatek Inc: "URLLC and eMBB DL Multiplexing using CRC masking and multibit NACK feedback", 3GPP Draft; R1-1702745, vol. RAN WG1, No. Athens; Feb. 13, 2017-Feb. 17, 2017, Feb. 12, 2017, XP051209892.
International Search Report in Application No. PCT/CN2017/089855, dated Feb. 28, 2018.
Panasonic :"Discussion on retransmission scheme of code block groups in NR", 3GPP TSG RAN WG1 Meeting #88bis, Spokane, USA, Apr. 3-7, 2017, R1-1705179.
TCL: "Preemption Indication Details for eMBB URLLC Multiplexing", 3GPP TSG RAN WG1 Meeting #89, Hangzhau, China May 15-19, 2017, R1-1708266.
Panasonic: "PDCCH for DL URLLC resource puncturing indication", 3GPP TSG RAN WG1 Meeting #88bis, Spokane, USA Apr. 3-7, 2017, R1-1705178.
India 1st Office Action in Application No. 202027002313, dated Feb. 25, 2021.
DCI considerations for CBG-based (re)-Transmissions (R1-1711203), 3GPP TSG RAN WG1 NR#2, Jun. 27-30, 2017, Qingdao, China.
Extended European Search Report in Application No. 17914509.9, dated Nov. 17, 2020.
U.S. Final Office Action in U.S. Appl. No. 16/623,927, notification date on Nov. 18, 2021.
U.S. Non-Final Office Action in U.S. Appl. No. 16/623,927, notification date on Jun. 14, 2021.
International Search Report in Application No. PCT/CN2017/089857, dated Mar. 21, 2018.
Summary of e-mail discussions on multiplexing eMBB and URLLC in DL (R1-1700972), TSG-RAN WG1 NR Ad-hoc Meeting, Spokane, USA, Jan. 16-20, 2017.
Indication of preemption of DL transmissions (R1-1707414), 3GPP TSG RAN WG1 Meeting #89, Hangzhou, P. R. China, May 15-19, 2017.

* cited by examiner

TIME-FREQUENCY RESOURCE PREEMPTION DETERMINING METHOD AND DEVICE, AND USER EQUIPMENT

CROSS-REFERENCE TO RELATED APPLICATION

This application is a national stage of International Application No. PCT/CN2017/089855 filed on Jun. 23, 2017, the disclosure of which is hereby incorporated by reference in its entirety.

TECHNICAL FIELD

The present disclosure relates to the field of communication technology, and more particularly, to a method and a device of determining time-frequency resource preemption, a user equipment, and a computer readable storage medium.

BACKGROUND

With the development of communication technology, the fifth-generation mobile communication technology (5th Generation, referred to as 5G) has emerged. The current business type of 5G comprises at least Enhanced Mobile Broad Band (eMBB), Massive Machine Type Communication (MMTC), Ultra Reliable Low Latency Communication (referred to as URLLC) and other types. These services are each data services, but the requirements for time delay and reliability are different. For example, the URLLC service is used in areas that require low latency, such as the vehicular networking, requires strong timeliness, and requires to be established timely and even has the capability of preempting the previous service when establishing a service. While the MMTC service is usually not sensitive to latency and the data can be delivered after a long interval. One way to achieve efficient transmission of latency-sensitive services is to improve the transmission of Hybrid Automatic Repeat ReQuest (HARQ), for example, to make retransmission feedback faster and more accurate.

In Long Term Evolution (LTE), HARQ feedback is performed in units of Transmission Blocks (TBs), and each TB feeds back response an acknowledgement (ACK) message or a non-acknowledgement (NACK) message of 1 bit. In order to improve the accuracy of retransmission, the 3rd Generation Partnership Project (3GPP) proposes to retransmit based on Code Block Group (CBG), which is a smaller unit of data unit in TB, and one CBG corresponds to ACK or NACK feedback of 1-bit. Since the retransmission granularity will be smaller, the position of the erroneous transmission can be more accurately reflected, thereby making the retransmission more accurate, and the retransmission efficiency is higher because the amount of data to be retransmitted is smaller.

However, if a service preemption occurs, for example, when an eMBB service has started to transmit or is about to start transmitting and a URLLC service arrives, the URLLC service will preempt the time-frequency resource for the transmission of the eMBB service, resulting in the original eMBB service incorrectly consider that there are error transmissions in the eMBB data according to the HARQ feedback, thereby discarding useful URLLC data. How to determine that the URLLC preempts the time-frequency resources of the eMBB is a technical problem that needs to be solved.

SUMMARY

In view of this, the present application discloses a method and a device configured to determine time-frequency resource preemption, a user equipment, and a computer readable storage medium, so as to determine the situation of time-frequency resources preemption between data of the services.

According to a first aspect of the embodiments of the present disclosure, there is provided a method of determining time-frequency resource preemption, the method comprising:

receiving and reading data of a first service sent by a base station;

if it is determined that the data of the first service fails to be received, reading scheduling control data of a second service in a set time period and in a set frequency range according to a time-frequency resource occupied by the data of the first service that fails to be received;

and if the scheduling control data of the second service is read, and if it is determined according to scheduling information carried in the scheduling control data of the second service that time-frequency resource area occupied by scheduled data of the second service overlaps time-frequency resource area occupied by the data of the first service that fails to be received, determining that data of the second service preempts the time-frequency resource of the data of the first service.

In an embodiment, that time-frequency resource area occupied by the scheduled data of the second service overlaps time-frequency resource area occupied by the data of the first service that fails to be received, comprises:

a time-frequency resource area occupied by the scheduled data of the second service partially overlaps or completely overlaps the time-frequency resource area occupied by the data of the first service that fails to be received.

In an embodiment, after determining that the data of the second service preempts the time-frequency resource of the data of the first service, the method further comprising:

retaining the data of the second service that preempts the time-frequency resource, and sending hybrid automatic repeat request (HARQ) feedback information of the data of the first service to a base station.

In an embodiment, the HARQ feedback information of the data of the first service sent to the base station comprises:

setting the receiving state of the data of the first service whose time-frequency resource is preempted as success, and sending the HARQ feedback information to the base station; or sending the HARQ feedback information to the base station according to the receiving state of the first data other than the data of the first service whose time-frequency resource is preempted.

In an embodiment, the set time period comprises a time period corresponding to the resource unit where the data of the first service that fails to be received is located and an adjacent time period thereof, or the time period corresponding to the resource unit where the data of the first service that fails to be received is located; the set frequency range is a frequency interval from the width difference between the frequency occupied by the data of the first service that fails to be received and the preset frequency interval to the width sum of the frequency occupied by the data of the first service that fails to be received and the preset frequency interval; the preset frequency interval width comprises a maximum frequency interval width occupied by the data of the second service.

According to a second aspect of the embodiments of the present disclosure, there is provided a device configured to determine time-frequency resource preemption, the device comprises:

a receiving and reading module, configured to receive and read the data of the first service sent by the base station;

a determining and reading module, configured to, after the receiving and reading module reads the data of the first service, read scheduling control data of a second service in a set time period and in a set frequency range according to a time-frequency resource occupied by the data of the first service that fails to be received, if it is determined that the data of the first service fails to be received; and a determining module, configured to determine that the data of the second service data preempts a time-frequency resource of the data of the first service, if the determining and reading module reads the scheduling control data of the second service, and determines according to scheduling information carried in the scheduling control data of the second service that a time-frequency resource area occupied by the scheduled data of the second service covers a time-frequency resource area occupied by the data of the first service that fails to be received.

In an embodiment, the determining module is configured to:

determine that a time-frequency resource area occupied by the scheduled data of the second service partially covers or completely covers the time-frequency resource area occupied by the data of the first service that fails to be received.

In an embodiment, the device further comprises:

a retaining and sending module, configured to retain the data of the second service data that preempts the time-frequency resource and send the HARQ feedback information of the data of the first service to the base station, after the determining module determines that the data of the second service preempts the time-frequency resource of the data of the first service.

In an embodiment, the retaining and sending module comprises:

a first sending unit, configured to set a receiving state of the data of the first service whose time-frequency resource is preempted as success, and send the HARQ feedback information to the base station; or a second sending unit, configured to send the HARQ feedback information to the base station according to the receiving state of the first data other than the data of the first service whose time-frequency resource is preempted.

In an embodiment, the set time period comprises a time period corresponding to a resource unit where the data of the first service that fails to be received is located and an adjacent time period thereof, or a time period corresponding to the resource unit where the data of the first service that fails to be received is located, the set frequency range is the frequency interval ranges from a difference between the frequency occupied by the data of the first service that fails to be received and the width of the preset frequency interval to a sum of the frequency occupied by the data of the first service that fails to be received and the width of the preset frequency interval. The width of preset frequency interval comprises a maximum frequency interval width occupied by the data of the second service.

According to a third aspect of the embodiments of the present disclosure, there is provided a user equipment, comprising:

a processor;

a memory, configured to store processor executable instructions;

wherein the processor is configured to:

receive and read data of a first service sent by a base station;

read scheduling control data of a second service in a set time period and in a set frequency range according to a time-frequency resource occupied by the data of the first service that fails to be received, if it is determined that the data of the first service fails to be received; and determine that data of the second service preempts the time-frequency resource of the data of the first service, if the scheduling control data of the second service is read, and it is determined according to scheduling information carried in the scheduling control data of the second service that a time-frequency resource area occupied by the scheduled data of the second service covers a time-frequency resource area occupied by the data of the first service that fails to be received.

According to a fourth aspect of the embodiments of the present disclosure, there is provided a computer readable storage medium having a computer program stored thereon, wherein the computer program is executed by a processor to implement the steps of the method of determining time-frequency resources preemption.

The technical solutions provided by the embodiments of the present disclosure can comprise the following beneficial effects:

By reading, according to the time-frequency resource occupied by the first data of the service that fails to be received, the scheduling control data of the second service within the set time period and the set frequency range, and if the scheduling control data of the second service is read, and it is determined according to the scheduling information carried in the scheduling control data of the second service that the time-frequency resource area occupied by the scheduled data of the second service covers the time-frequency resource area occupied by the data of the first service that fails to be received, it can be determined that the data of the second service preempts the time-frequency resource of the data of the first service, so that a situation of time-frequency resource preemption between the data of services can be judged.

By describing the time-frequency resource area occupied by the scheduled data of the second service partially covers or completely covers the time-frequency resource area occupied by the data of the first service that fails to be received, manners of covering can be clearly defined.

By retaining the data of the second service that preempts time-frequency resource, the purpose of retaining the data of the second service that is useful is achieved, so that the data of the second service can be properly transmitted. Further, by sending the hybrid automatic repeat request HARQ feedback information of the data of the first service to the base station, according to which, the base station can identify the eMBB data that fails to be sent, thereby providing conditions for resending the eMBB data that failed to be sent.

The HARQ feedback information can be sent to the base station in multiple manners, and the implementation of the manner is flexible and diverse.

The scheme is made clear by describing meaning of the set time period and the set frequency range.

It should be understood that the above general description and the following detailed description are merely exemplary and explanatory, which cannot be construed as a limit to the present disclosure.

BRIEF DESCRIPTION OF THE DRAWINGS

The attached drawings herein are incorporated into the specification and constitute part of the disclosure, illustrat

DETAILED DESCRIPTION

Exemplary embodiments will be described in detail herein, examples of which are illustrated in the accompanying drawings. When the following description relates to the drawings, the same or similar reference sign in the different figures refers to the same or similar element unless otherwise indicated. The embodiments described in the following exemplary embodiments do not represent all embodiments consistent with the present disclosure. Instead, they are merely examples of devices and methods consistent with aspects of the disclosure as set forth in the appended claims.

Figure 1:
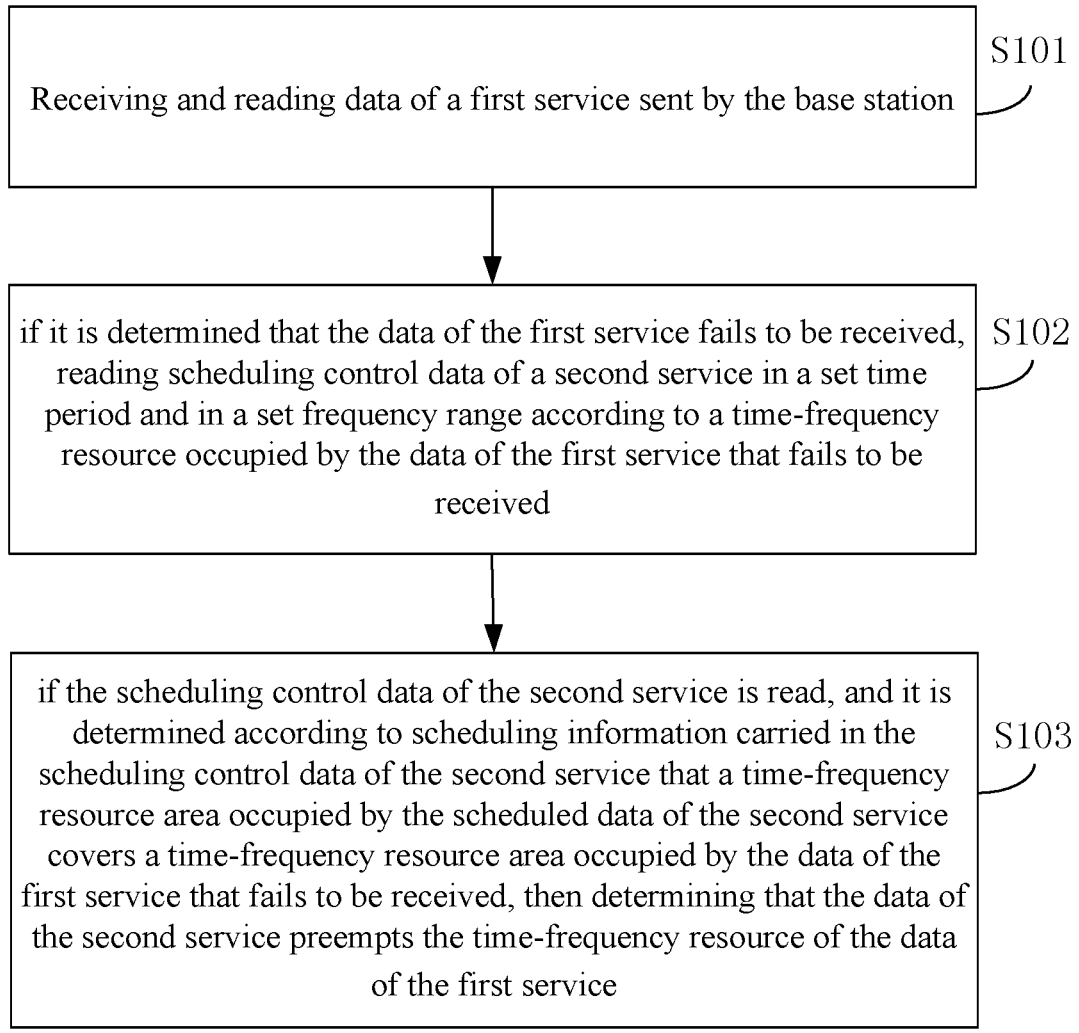
- FIG. 1 is a flowchart of a method of determining time-frequency resource preemption according to an exemplary embodiment of the present disclosure.

FIG. 1 is a flowchart of a method of determining time-frequency resource preemption according to an exemplary embodiment of the present application, the embodiment is described in a view at the user equipment (UE) side. As illustrated in FIG. 1, the method of determining time-frequency resource preemption comprises:

in step S101, receiving and reading data of a first service sent by the base station.

In this embodiment, the UE can receive the data of the first service sent by the base station in a preset resource unit, wherein the preset resource unit can comprise, but is not limited to, subframe, slot, and symbol and the code block group (CBG) or the like, and the data of the first service data comprise but is not limited to eMBB data.

In step S102, if it is determined that the data of the first service fails to be received, reading scheduling control data of a second service in a set time period and in a set frequency range according to a time-frequency resource occupied by the data of the first service that fails to be received.

Wherein, the second service can comprise, but is not limited to URLLC. The scheduling control data can comprise, but is not limited to physical downlink control channel (PDCCH), and the second service has a higher priority than the first service, that is, the second service requires higher timeliness than the first service.

Figure 2A:
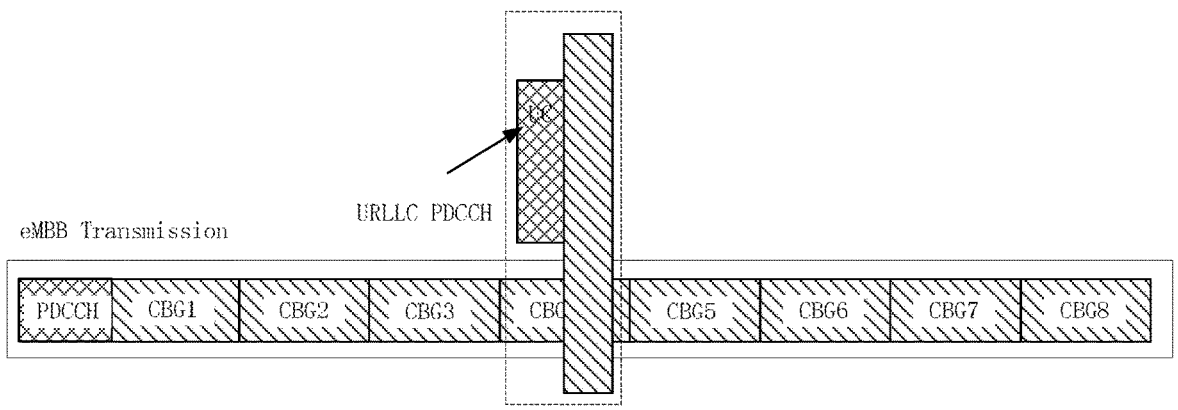
FIG. 2A is a schematic diagram illustrating a first service data that fails to be received according to an exemplary embodiment of the present disclosure.
Figure 2B:
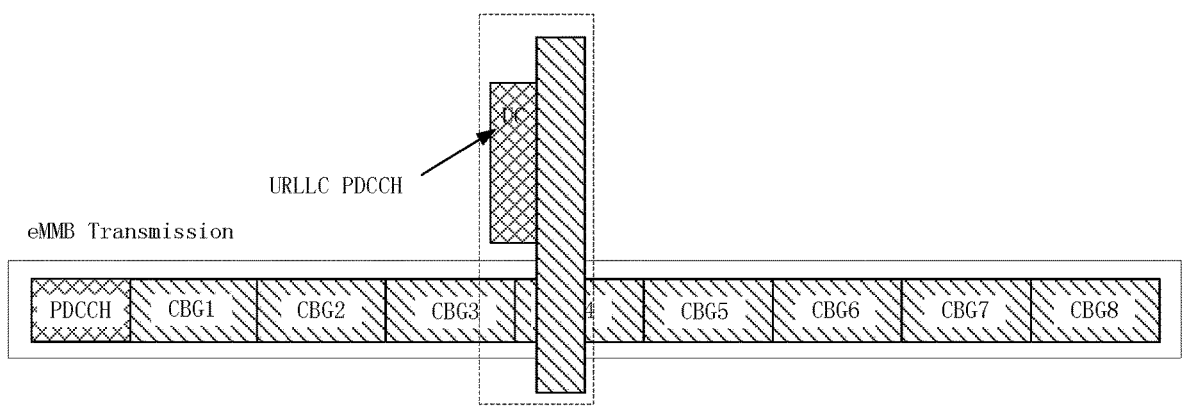
FIG. 2B is a schematic diagram illustrating another first service data that fails to be received according to an exemplary embodiment of the present disclosure.

Wherein, the set time period comprises a time period corresponding to the resource unit where the data of the first service that fails to be received is located and an adjacent time period thereof, or the time period corresponding to the resource unit where the data of the first service that fails to be received is located. For example, the UE reads the eMBB data sent by the base station in units of each CBG, when it is determined that the eMBB data fails to be received, as illustrated in FIG. 2A, the set time period comprises a time period corresponding to CBG4 in FIG. 2A. For another example, the UE reads the eMBB data sent by the base station in units of every two CBGs, when it is determined that the eMBB data fails to be received as illustrated in FIG. 2B (that is, the eMBB data of CBG4 fails to be received), the set time period comprises the time period corresponding to CBG4 and an adjacent time period of CBG4, that is, the time period corresponding to CBG3 as illustrated in FIG. 2B.

The set frequency range is the frequency interval from the width difference between the frequency occupied by the first service that fails to be received and the preset frequency interval to the width sum of the frequency occupied by the data of first service that fails to be received and the preset frequency interval. Assuming that the frequency occupied by the data of the first service that fails to be received is A, and the width of the preset frequency interval is L, then the set frequency range is (A−L, A+L).

In this embodiment, the width of the preset frequency interval can comprise the maximum width of the frequency interval occupied by the data of the second service data. It should be noted that the maximum width of the frequency interval occupied by the data of the second service is the minimum value of the preset frequency interval width, that is, the width of the preset frequency interval is greater than or equal to the maximum width of the frequency interval occupied by the data of the second service.

In step S103, if the scheduling control data of the second service is read, and it is determined according to scheduling information carried in the scheduling control data of the second service that a time-frequency resource area occupied by the scheduled data of the second service covers a time-frequency resource area occupied by the data of the first service that fails to be received, then determining that the data of the second service preempts the time-frequency resource of the data of the first service.

The time-frequency resource area occupied by the data of service refers to the area corresponding to the time domain resource and the frequency domain resource occupied by the data of service.

In this embodiment, after reading the scheduling control data of the second service, such as a URLLC PDCCH, in the set time period and in the set frequency range, if a URLLC PDCCH is read, and it is determined, according to scheduling information carried in the URLLC PDCCH, that time-frequency resource area occupied by the scheduled URLLC data partially covers or completely covers the time-frequency resource area occupied by the eMBB data that fails to be received, then it can be determined that the URLLC data preempts the time-frequency resource area of the eMBB data.

In the above embodiment, by reading the scheduling control data of the second service in the set time period and in the set frequency range according to the time-frequency resource occupied by the data of the first service that fails to be received, and when the scheduling control data of the second service is read, and it is determined according to scheduling information carried in the scheduling control data of the second service that the time-frequency resource area occupied by the scheduled data of the second service covers the time-frequency resource area occupied by the data of the first service that fails to be received, then it can be determined that the data of the second service preempts the time-frequency resource of the data of the first service, so that the situation of preempting the time-frequency resources between the data of the services can be identified.

Figure 3:
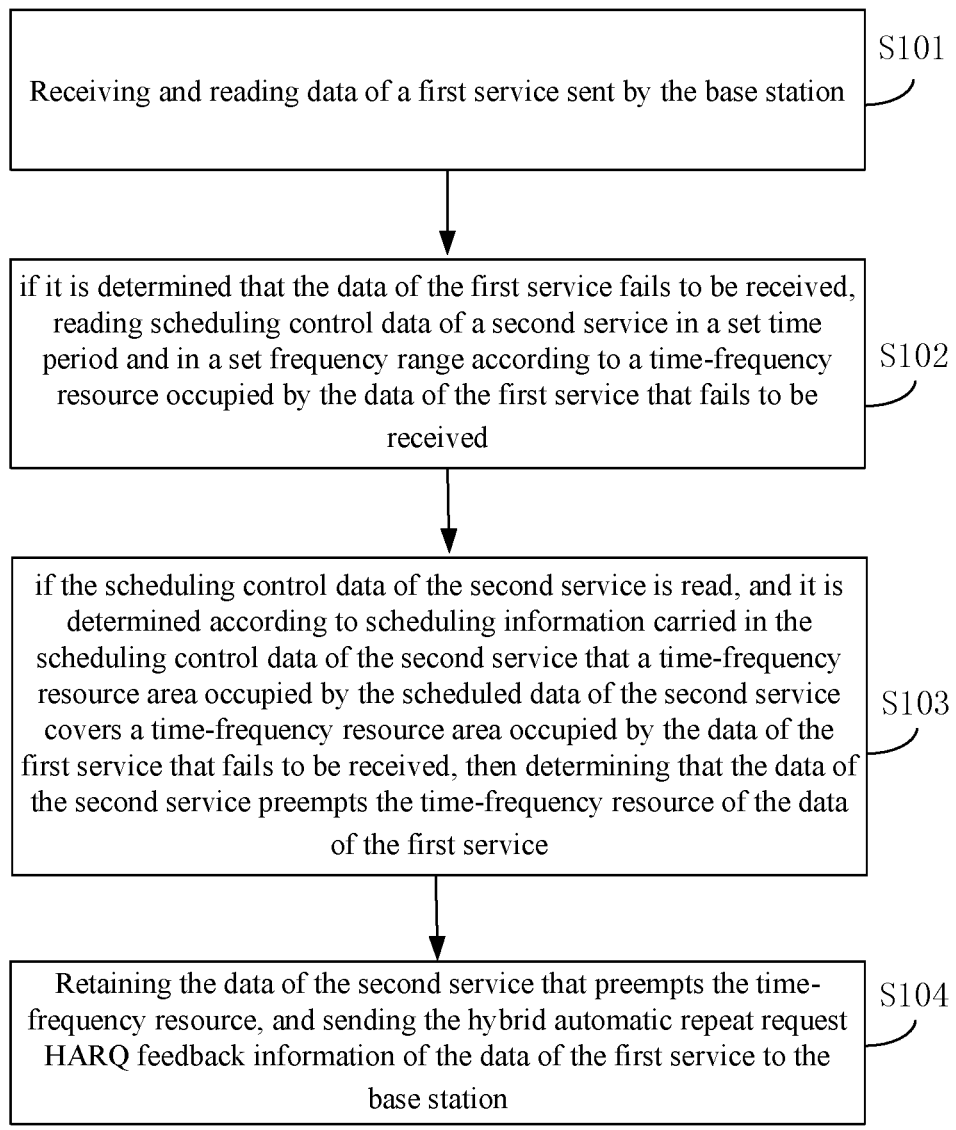
FIG. 3 is a flowchart illustrating another method of determining time-frequency resource preemption according to an exemplary embodiment of the present disclosure.

FIG. 3 is a flowchart of another method of determining time-frequency resource preemption according to an exemplary embodiment of the present application, as illustrated in FIG. 3, after the step S103, the method can further comprise:

in step S104, retaining the data of the second service that preempts the time-frequency resource, and sending the hybrid automatic repeat request HARQ feedback information of the data of the first service to the base station.

In this embodiment, since the data of the second service that preempts the time-frequency resource are useful data, the data of the second service that preempts the time-frequency resource will not be erased, that is, the UE retains the data of the second service data that preempts the time-frequency resource.

In this embodiment, the UE can send the HARQ feedback information of the data of the first service to the base station in multiple manners. For example, the HARQ feedback information can be sent to the base station in the following two manners:

in the first manner, setting a receiving state of the data of the first service whose time-frequency resource is preempted as success, and sending the HARQ feedback information of the data of the first service to the base station.

For example, the receiving state of the eMBB data corresponding to the CBG4 in FIG. 2A can be set as success, and the eMBB data corresponding to other CBGs can be fed back according to the existing manner, that is, the receiving state of the eMBB data corresponding to other CBGs is success, and corresponding HARQ feedback information is sent to the base station.

In the second manner, a HARQ feedback information can be sent to the base station according to the receiving state of the first data other than the data of the first service whose time-frequency resource is preempted.

FIG. 2A is still taken as an example. In FIG. 2A, the eMBB data corresponding to the CBG4 is the data of the first service whose time-frequency resource is preempted, and the UE can send the HARQ feedback information of the CBG1, CBG2, CBG3, CBG5, CBG6, CBG7, CBG8 to the base station.

After receiving the HARQ feedback information sent by the UE, the base station can determine which eMBB data fails to be sent based on this, and resend the eMBB data that fails to be sent.

It can be seen that the HARQ feedback information can be sent to the base station in multiple manners in the embodiment, and the implementing manners are flexible and diverse.

Figure 4:
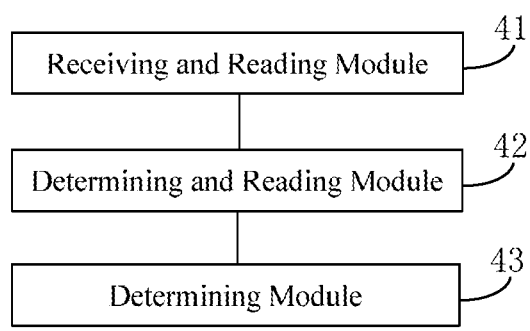
FIG. 4 is a block diagram illustrating a device configured to determine time-frequency resource preemption according to an exemplary embodiment.

In the above embodiment, by retaining the data of the second service that preempts time-frequency resource, the purpose of retaining the useful second service data is achieved, so that the data of the second service data can be properly transmitted. Further, by sending the hybrid automatic repeat request HARQ feedback information of the data of the first service to the base station, according to which, the base station can determine which eMBB data fails to be sent based on this, thereby providing conditions for resending the eMBB data that fails to be sent;

FIG. 4 is a block diagram of a device configured to determine time-frequency resource preemption according to an exemplary embodiment. The device configured to determine time-frequency resource preemption is disposed in a UE. As illustrated in FIG. 4, the device configured to determine time-frequency resource preemption comprises: a receiving and reading module 41, a determining and reading module 42, and a determining module 43.

The receiving and reading module 41 is configured to receive and read data of a first service data sent by a base station.

In this embodiment, the UE can receive the data of the first service sent by the base station in a preset resource unit, wherein the preset resource unit can comprise, but is not limited to, subframe, slot, and symbol and the code block group (CBG) or the like, the data of the first service can comprise but is not limited to eMBB data.

The determining and reading module 42 is configured to, after the receiving and reading module 41 reads the data of the first service, read scheduling control data of a second service in a set time period and in a set frequency range according to a time-frequency resource occupied by the data of the first service that fails to be received, if it is determined that the data of the first service fails to be received;

Wherein, the second service can comprise, but is not limited to URLLC. The scheduling control data can comprise, but is not limited to physical downlink control channel (PDCCH), and the second service has a higher priority than the first service, that is, the second service requires higher timeliness than the first service.

Wherein, the set time period comprises a time period corresponding to the resource unit where the data of the first service that fails to be received is located and an adjacent time period thereof, or a time period corresponding to the resource unit where the data of the first service that fails is to be received islocated. For example, the UE reads the eMBB data sent by the base station in units of each CBG, when it is determined that the eMBB data fails to be received as illustrated in FIG. 2A, the set time period comprises a time period corresponding to CBG4 in FIG. 2A. For another example, the UE reads the eMBB data sent by the base station in units of every two CBGs. When it is determined that the eMBB data fails to be received as illustrated in FIG. 2B (that is, the eMBB data of CBG4 fails to be received), the set time period comprises the time period corresponding to CBG4 and the adjacent time period of CBG4, that is, the time period corresponding to CBG3 illustrated in FIG. 2B.

The set frequency range is the frequency interval from the width difference between the frequency occupied by the data of the first service that fails to be received and the preset frequency interval to the width sum of the frequency occupied by the data of the first service that fails to be received and the preset frequency interval. Assuming that the frequency occupied by the data of the first service that fails to be received is A, and the width of the preset frequency interval is L, then the set frequency range is (A−L, A+L).

In this embodiment, the width of the preset frequency interval can comprise a maximum width of frequency interval occupied by the data of the second service. It should be noted that the maximum width of frequency interval occupied by the data of the second service is the minimum value for the width of the preset frequency interval, that is, the preset width of the frequency interval is greater than or equal to the maximum width of the frequency interval occupied by the data of the second service.

The determining module 43 is configured to, determine that the data of the second service preempts the time-frequency resource of the data of the first service, if the determining and reading module 42 reads the scheduling control data of the second service, and it is determined according to scheduling information carried in the scheduling control data of the second service that a time-frequency resource area occupied by the scheduled data of the second service covers a time-frequency resource area occupied by the data of the first service that fails to be received.

Wherein, the determining module 43 can be configured to determine that the time-frequency resource area occupied by the scheduled data of the second service partially covers or completely covers the time-frequency resource area occupied by the data of the first service that fails to be received.

Wherein, the time-frequency resource area occupied by the data of services refers to the area corresponding to the time domain resource and the frequency domain resource occupied by the data of the services.

In this embodiment, after reading the scheduling control data of the second service, such as the URLLC PDCCH, in the set time period and in the set frequency range, if the URLLC PDCCH is read, and it is determined, according to the scheduling information carried in the URLLC PDCCH, that time-frequency resource area occupied by the scheduled URLLC data partially covers or completely covers the time-frequency resource area occupied by the eMBB data that fails to be received, then it can be determined that the URLLC data preempts the time-frequency resource area of the eMBB data.

In the above embodiment, by reading the scheduling control data of the second service in the set time period and in the set frequency range according to the time-frequency resource occupied by the data of the first service that fails to be received, and if the scheduling control data of the second service is read, and it is determined according to scheduling information carried in the scheduling control data of the second service that the time-frequency resource area occupied by the scheduled data of the second service covers the time-frequency resource area occupied by the data of the first service that fails to be received, then it can be determined that the data of the second service preempts the time-frequency resource of the data of the first service, so that a situation of preempting the time-frequency resources between the service data can be identified.

Figure 5:
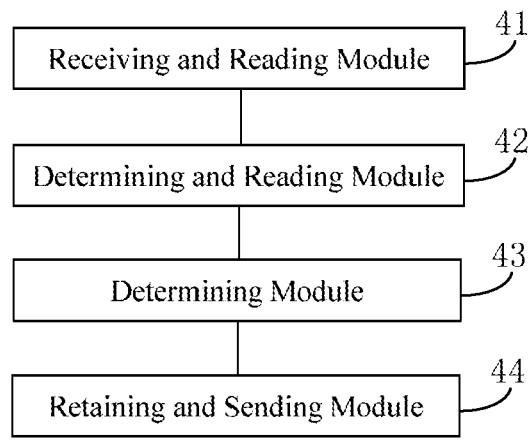
FIG. 5 is a block diagram illustrating another device configured to determine time-frequency resource preemption according to an exemplary embodiment.

FIG. 5 is a block diagram of another device configured to determine time-frequency resource preemption according to an exemplary embodiment. As illustrated in FIG. 5, on the basis of the above embodiment illustrated in FIG. 4, the device can further comprise: a retaining and sending module 44.

The retaining and sending module 44 is configured to retain the data of the second service that preempts the time-frequency resource and sending the HARQ feedback information of the data of the first service to the base station, after the determining module 43 determines that the data of the second service data preempts the time-frequency resource of the data of the first service.

In this embodiment, since the data of the second service that preempts the time-frequency resource is useful data, the data of the second service that preempts the time-frequency resource should not be erased, that is, the UE retains the data of the second service that preempts the time-frequency resource.

In the above embodiment, by retaining the data of the second service data that preempts time-frequency resource, the purpose of retaining the useful data of the second service that is useful is achieved, so that the data of the second service can be properly transmitted. Further, by sending the hybrid automatic repeat request HARQ feedback information of the data of the first service to the base station, the base station can determine the eMBB data that fails to be sent based on this, thereby providing conditions for resending the eMBB data that failed to be sent.

Figure 6:
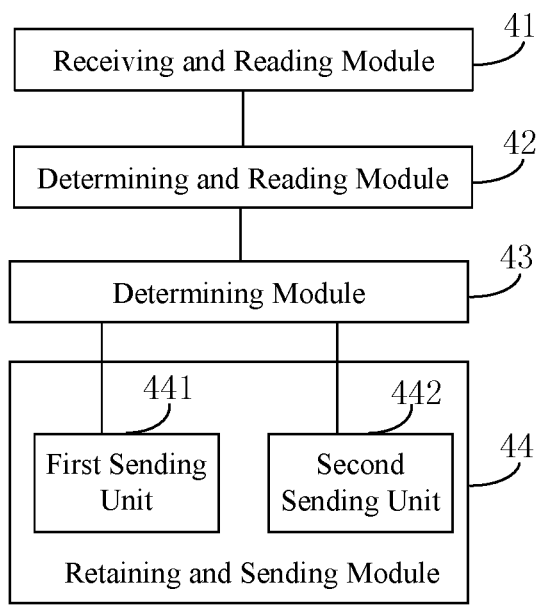
FIG. 6 is a block diagram illustrating another device configured to determine time-frequency resource preemption according to an exemplary embodiment.

FIG. 6 is a block diagram of another device configured to determine time-frequency resource preemption according to an exemplary embodiment. As illustrated in FIG. 6, on the basis of the above embodiment illustrated in FIG. 5, the retaining and sending module 44 can comprise: a first sending unit 441 or a second sending unit 442.

The first sending unit 441 is configured to set a receiving state of the data of the first service whose time-frequency resource is preempted as success, and send the HARQ feedback information to the base station.

The second sending unit 442 is configured to send the HARQ feedback information to the base station according to a receiving state of the first data other than the data of the first service whose time-frequency resource is preempted.

In this embodiment, the UE can send the HARQ feedback information of the data of the first service to the base station in multiple manners. For example, the HARQ feedback information can be sent to the base station in the following two manners:

in the first manner, setting the receiving state of the data of the first service whose time-frequency resource is preempted as success, and sending the HARQ feedback information to the base station.

For example, the receiving state of the eMBB data corresponding to the CBG4 in FIG. 2A can be set as success, and the eMBB data corresponding to other CBGs can be fed back according to the existing manner, that is, the receiving state of the eMBB data corresponding to other CBGs is success, and the corresponding HARQ feedback information is sent to the base station.

In the second manner, the HARQ feedback information can be sent to the base station according to the receiving state of the data of the first data other than the data of the first service whose time-frequency resource is preempted.

FIG. 2A is still taken as an example. In FIG. 2A, the eMBB data corresponding to the CBG4 is the data of the first service whose time-frequency resource is preempted, and the UE can send the HARQ feedback information of the CBG1, CBG2, CBG3, CBG5, CBG6, CBG7, CBG8 to the base station.

After receiving the HARQ feedback information sent by the UE, the base station can determine which eMBB data fails to be sent according to this, and resend the eMBB data that failed to be sent.

In the above embodiment, the HARQ feedback information can be sent to the base station in multiple manners, and the implementing manners are flexible and diverse.

Figure 7:
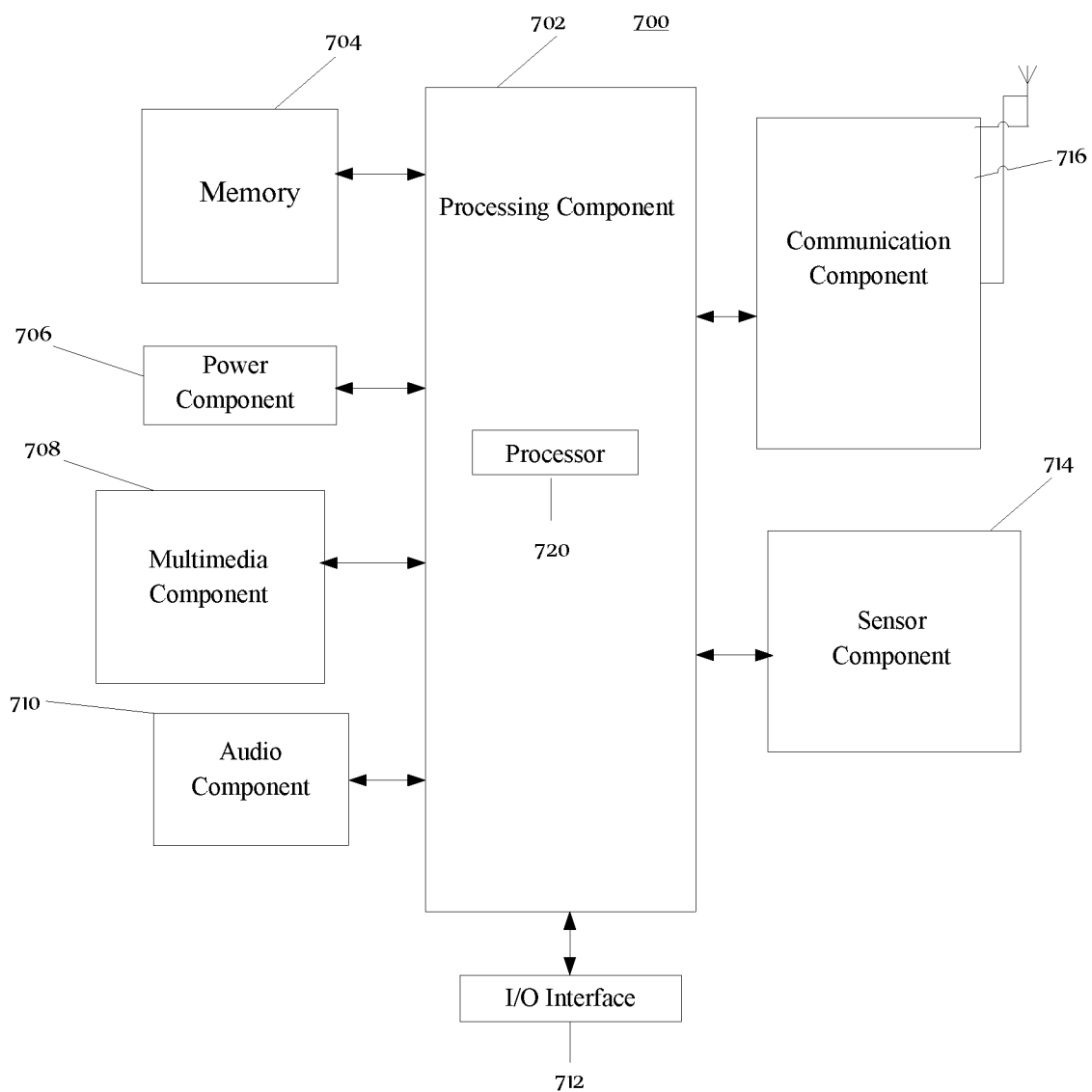
FIG. 7 is a block diagram illustrating a determining device suitable to the time-frequency resource preemption according to an exemplary embodiment.

FIG. 7 is a block diagram of a device applicable to determine time-frequency resource preemption according to an exemplary embodiment. For example, device 700 can be a user equipment such as a mobile phone, a computer, a digital broadcast terminal, a messaging device, a game console, a tablet device, a medical device, a fitness device, a personal digital assistant, and the like.

Referring to FIG. 7, device 700 can comprise one or more of the following components: a processing component 702, a memory 704, a power component 704, a power component 706, a multimedia component 708, an audio component 710, an input/output (I/O) interface 712, a sensor component 714, and a communication component 716.

Processing component 702 typically controls overall operation of the device 700, such as operations associated with display, telephone calls, data communication, camera operation, and recording operation. Processing component 702 can comprise one or more processors 720 to execute instructions to perform all or part of the steps of the methods described above. Moreover, the processing component 702 can comprise one or more modules to facilitate interaction between the processing component 702 and other components. For example, processing component 702 can comprise a multimedia module to facilitate interaction between the multimedia component 708 and the processing component 702.

The memory 704 is configured to store various types of data to support operation of device 700. Examples of such data comprise instructions for any application or method running on device 700, contact data, phone book data, messages, pictures, videos, and the like. The memory 704 can be implemented by any type of volatile or non-volatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), Magnetic Memory, Flash Memory, Magnetic Disk or Optical Disk.

The power component 706 supplies power to various components of the device 700. The power component 706 can comprise a power management system, one or more power sources, and other components associated with generating, managing, and distributing power for the device 700.

The multimedia component 708 comprises a screen that provides an output interface between the device 700 and the user. In some embodiments, the screen can comprise a Liquid Crystal Display (LCD) and a Touch Panel (TP). If the screen comprises a touch panel, the screen can be implemented as a touch screen to receive input signals from the user. The touch panel comprises one or more touch sensors to sense touches, sliding, and gestures on the touch panel. The touch sensor can sense not only the boundaries of the touch or sliding action, but also the duration and pressure associated with the touch or slide operation. In some embodiments, the multimedia component 708 comprises a front camera and/or a rear camera. When the device 700 is in an operation mode, such as a shooting mode or a video mode, the front camera and/or the rear camera can receive external multimedia data. Each front and rear camera can be a fixed optical lens system having a focal length and optical zoom capabilities.

The audio component 710 is configured to output and/or input an audio signal. For example, audio component 710 comprises a microphone (MIC) that is configured to receive an external audio signal when the device 700 is in an operational mode, such as a call mode, a recording mode, and a voice recognition mode. The received audio signal can be further stored in the memory 704 or sent via the communication component 716. In some embodiments, the audio component 710 further comprises a speaker configured to output an audio signal.

The I/O interface 712 provides an interface between the processing component 702 and peripheral interface modules, which can be a keyboard, a click wheel, a button, or the like. These buttons can comprise, but are not limited to, a home button, a volume button, a start button, and a lock button.

Sensor assembly 714 comprises one or more sensors for providing status assessment of various aspects for the device 700. For example, sensor component 714 can detect an ON/OFF state of device 700, a relative positioning of the components that are, for example, a display and a keypad of device 700, and the sensor component 714 can further detect a change in position of a component of the device 700 or the device 700, presence or absence of contact between user and device 700, orientation or acceleration/deceleration of the device 700 and temperature change of the device 700. The sensor component 714 can comprise a proximity sensor configured to detect presence of nearby objects without any physical contact. The sensor component 714 can further comprise a light sensor, such as a CMOS or CCD image sensor, configured for imaging applications. In some embodiments, the sensor component 714 can further comprise an acceleration sensor, a gyro sensor, a magnetic sensor, a pressure sensor, or a temperature sensor.

The communication component 716 is configured to facilitate wired or wireless communication between the device 700 and other devices. The device 700 can access a wireless network under a communication standard, such as Wi-Fi, 2G or 3G, or a combination thereof. In an exemplary embodiment, the communication component 716 receives broadcast signals or broadcast associated information from an external broadcast management system via a broadcast channel. In an exemplary embodiment, the communication component 716 further comprises a near field communication (NFC) module to facilitate short range communication. For example, the NFC module can be implemented based on Radio Frequency Identification (RFID) technology, Infrared Data Association (IrDA) technology, Ultra-wideband (UWB) technology, Bluetooth (BT) technology, and other technologies.

In an exemplary embodiment, device 700 can be implemented by one or more application specific integrated circuits (ASICs), digital signal processors (DSPs), digital signal processing devices (DSPDs), programmable logic devices (PLDs), field programmable gate array (FPGA), controllers, microcontrollers, microprocessors, or other electronic components, and configured to perform the methods described above.

In an exemplary embodiment, there is further provided a non-transitory computer readable storage medium comprising instructions, such as the memory 704 comprising instructions executable by processor 720 of device 700 to perform the above method. For example, the non-transitory computer readable storage medium can be a ROM, a random-access memory (RAM), a CD-ROM, a magnetic tape, a floppy disk, and an optical data storage apparatus.

For the embodiment of the device, since it basically corresponds to the embodiment of the method, reference can be made to the description on the parts of the embodiments of the method. The embodiments of the device described above are merely illustrative, wherein the units described as separate components may or may not be physically separate, and the components displayed as units may or may not be physical units, i.e. can be located a place, or it can be distributed on multiple network units. Some or all of the modules can be selected according to actual requirements to achieve the purpose of the solution of the embodiment. Those of ordinary skill in the art can understand and implement the disclosure without any creative effort.

It should be noted that, in this context, relational terms such as first and second are used merely to distinguish one entity or operation from another entity or operation, and do not necessarily require or imply that there is any such actual relationship or order between these entities or operations. The terms "including", "comprising" or any other variation thereof are intended to include a non-exclusive inclusion, such that a process, method, article, or device that comprises a plurality of elements includes not only those elements but also other elements not specifically listed, or elements that are inherent to such a process, method, item, or device. An element that is defined by the phrase "comprising a . . . " does not exclude the presence of additional equivalent elements in the process, method, item, or device that comprises the element.

Other embodiments of the present disclosure will be readily apparent to those skilled in the art after considering the specification and practicing the disclosure. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is set forth by the claims below.

It should be understood that this disclosure is not limited to the exact structure described above and illustrated in the accompanying drawings, and can be subject to various modifications and changes without deviating from its scope. The scope of the disclosure is to be limited only by the appended claims.

The invention claimed is:

1. A method of determining time-frequency resource preemption, wherein the method comprises:
   receiving and reading data of a first service sent by a base station;
   reading scheduling control data of a second service in a set time period and set frequency range corresponding to a time-frequency resource occupied by data of the first service that fails to be received, upon it is determined that the data of the first service fails to be received, wherein the scheduling control data comprises a time-frequency resource area occupied by scheduled data of the second service; and
   determining that data of the second service preempts the time-frequency resource of the data of the first service, in response to determining that the time-frequency resource area occupied by the scheduled data of the second service in the scheduling control data covers a time-frequency resource area occupied by the data of the first service data that fails to be received.

2. The method according to claim 1, wherein that the time-frequency resource area occupied by the scheduled data of the second service in the scheduling control data covers the time-frequency resource area occupied by the data of the first service that fails to be received, comprises:
   the time-frequency resource area occupied by the scheduled data of the second service data partially covers or completely covers the time-frequency resource area occupied by the data of the first service that fails to be received.

3. The method according to claim 2, wherein, after determining that the data of the second service data preempts the time-frequency resource of the data of the first service, the method further comprises:
   retaining the data of the second service that preempts the time-frequency resource; and
   sending hybrid automatic repeat request HARQ feedback information of the data of the first service to the base station.

4. The method according to claim 3, wherein sending the hybrid automatic repeat request HARQ feedback information of the data of the first service to the base station comprises:
   setting receiving state of the data of the first service whose time-frequency resource is preempted as success, and sending the HARQ feedback information to the base station; or
   sending the HARQ feedback information to the base station according to receiving state of a first data other than the data of the first service whose time-frequency resource is preempted.

5. The method according to claim 1, wherein, after determining that the data of the second service data preempts the time-frequency resource of the data of the first service, the method further comprising:
   retaining the data of the second service that preempts the time-frequency resource, and sending hybrid automatic repeat request HARQ feedback information of the data of the first service to the base station.

6. The method according to claim 5, wherein saki sending the HARQ feedback information of the data of the first service to the base station comprises:
   setting receiving state of the data of the first service whose time-frequency resource is preempted as success, and sending the HARQ feedback information to the base station; or
   sending the HARQ feedback information to the base station according to receiving state of first data other than the data of the first service whose time-frequency resource is preempted.

7. The method according to claim 1, wherein the set time period comprises a time period corresponding to a resource unit where the data of the first service that fails to be received is located and an adjacent time period thereof, or a time period corresponding to the resource unit where the data of the first service that fails to be received is located; the set frequency range is a frequency interval from a difference between the frequency occupied by the data of the first service that fails to be received and a preset frequency interval width to a sum of the frequency occupied by the data of the first service that fails to be received and the preset frequency interval width; the preset frequency interval width comprises a maximum frequency interval width occupied by the data of the second service.

8. A user equipment, comprising:
   a processor; and
   a memory, configured to store processor executable instructions;
   wherein the processor is configured to:
   receive and read data of a first service;
   read scheduling control data of a second service in a set time period and set frequency range corresponding to a time-frequency resource occupied by the data of the first service that fails to be received, upon it is determined that the data of the first service fails to be received, wherein the scheduling control data comprises a time-frequency resource area occupied by scheduled data of the second service; and
   determine that data of the second service preempts the time-frequency resource of the data of the first service, in response to determining that the time-frequency resource area occupied by the scheduled data of the second service in the scheduling control data covers a time-frequency resource area occupied by the data of the first service that fails to be received.

9. The user equipment according to claim 8, wherein that the time-frequency resource area occupied by the scheduled data of the second service in the scheduling control data covers the time-frequency resource area occupied by the data of the first service that fails to be received, comprises:

the time-frequency resource area occupied by the scheduled data of the second service data partially covers or completely covers the time-frequency resource area occupied by the data of the first service that fails to be received.

10. The user equipment according to claim 9, wherein, after determining that the data of the second service data preempts the time-frequency resource of the data of the first service, the processor is further configured to:
retain the data of the second service that preempts the time-frequency resource; and
send hybrid automatic repeat request HARQ feedback information of the data of the first service to the base station.

11. The user equipment according to claim 10, wherein said sending the hybrid automatic repeat request HARQ feedback information of the data of the first service to the base station comprises:
setting receiving state of the data of the first service whose time-frequency resource is preempted as success, and sending the HARQ feedback information to the base station; or
sending the HARQ feedback information to the base station according to receiving state of a first data other than the data of the first service whose time-frequency resource is preempted.

12. The user equipment according to claim 8, wherein after determining that the data of the second service data preempts the time-frequency resource of the data of the first service, the processor is further configured to:
retain the data of the second service that preempts the time-frequency resource, and send hybrid automatic repeat request HARQ feedback information of the data of the first service to the base station.

13. The user equipment according to claim 12, wherein said sending the HARQ feedback information of the data of the first service to the base station comprises:
setting receiving state of the data of the first service whose time-frequency resource is preempted as success, and sending the HARQ feedback information to the base station; or
sending the HARQ feedback information to the base station according to receiving state of first data other than the data of the first service whose time-frequency resource is preempted.

14. The user equipment according to claim 8, wherein the set time period comprises a time period corresponding to a resource unit where the data of the first service that fails to be received is located and an adjacent time period thereof, or a time period corresponding to the resource unit where the data of the first service that fails to be received is located; the set frequency range is a frequency interval from a difference between the frequency occupied by the data of the first service that fails to be received and a preset frequency interval width to a sum of the frequency occupied by the data of the first service that fails to be received and the preset frequency interval width; the preset frequency interval width comprises a maximum frequency interval width occupied by the data of the second service.

15. A non-transitory computer readable storage medium having a computer program stored thereon, wherein steps of the method of determining time-frequency resource preemption according to claim 1 are implemented when the program is executed by a processor.

16. A communication system comprising a user equipment (UE) configured to:
receive and read data of a first service sent by a base station;
read scheduling control data of a second service within a set time period and set frequency range corresponding to a time-frequency resource occupied by data of the first service that fails to be received, upon it is determined that the data of the first service fails to be received, wherein the scheduling control data comprises a time-frequency resource area occupied by scheduled data of the second service; and
determine that data of the second service preempts the time-frequency resource of the data of the first service in response to determining that the time-frequency resource area occupied by the scheduled data of the second service in the scheduling control data covers a time-frequency resource area occupied by the data of the first service data that fails to be received, thereby identifying a situation of time-frequency resource preemption between the data of services.

17. The communication system according to claim 16, wherein the system is configured to, by describing the time-frequency resource area occupied by the scheduled data of the second service partially covers or completely covers the time-frequency resource area occupied by the data of the first service that fails to be received, define manners of covering.

18. The communication system of claim 17, further comprising the base station, wherein:
the system is further configured to, by retaining the data of the second service that preempts time-frequency resource, retain the data of the second service that is useful, thereby facilitating proper transmission of the data of the second service;
the UE is configured to send hybrid automatic repeat request HARQ feedback information of the data of the first service to the base station; and
the base station is configured to identify eMBB data that fails to be sent, according to the hybrid automatic repeat request HARQ feedback information of the data of the first service, thereby providing conditions for resending the eMBB data that failed to be sent.

19. The communication system of claim 18, wherein:
the UE is further configured to send the HARQ feedback information to the base station in multiple manners; and
the system is further configured to define the set time period and the set frequency range.

* * * * *